INVENTOR.
ALDO J. GIUSTI
BY Joseph J. Cole
ATTORNEY

United States Patent Office 3,428,048
Patented Feb. 18, 1969

3,428,048
APPARATUS FOR STRIPPING BRUSSELS SPROUTS
Aldo J. Giusti, Rte. 1, Box 301,
Half Moon Bay, Calif. 94019
Filed Sept. 21, 1965, Ser. No. 488,909
U.S. Cl. 130—30      4 Claims
Int. Cl. A01d; A01f 7/00, 9/00

ABSTRACT OF THE DISCLOSURE

An apparatus for stripping Brussels sprouts and being provided with a cutter having a guide surface disposed to have the main stalk of an unimpaled Brussels sprout plant advanced therealong, the cutter having an edge disposed to strip sprouts from the plant, and this cutter being connected to a rapid-speed vibrator that is continuously reciprocated back and forth in short strokes. The cutter is unobstructed from its front so that an operator may hold and freely move the plant into engagement with the cutter during stripping of the sprouts.

---

The present invention relates to improvements in an apparatus for stripping Brussels sprouts. It consists of the combinations, constructions and arrangement of parts, as hereinafter described and claimed.

It is a well known fact that a Brussels sprout plant has a main stalk on which the sprouts are grown, and the individual sprouts must be removed during the harvesting of the Brussels sprouts, with the culls and other debris being discarded. This operation requires a great deal of hand labor and is quite tedious and time consuming. Resort has been made to automatic machines for stripping the Brussels sprouts, but they are rather complicated and expensive.

As the cardinal object of this invention, it is proposed to provide a simplified apparatus that may be used efficiently for stripping the Brussels sprouts, requiring the operator to merely hold the Brussels sprout plant in a predetermined position relative to a vibrating cutter, the latter having a guide surface over which the main stalk of the plant may be moved as the latter is advanced toward the cutter. Moreover, the cutter will strip the sprouts from the main stalk even though the stalk may be crooked, and the apparatus includes a grill that will separate sprouts of a predetermined minimum size from the culls, stems of the leaves and other debris of the plant.

Another object of the invention is to provide an apparatus for stripping Brussels sprouts that may be operated efficiently by inexperienced persons, requiring only a minimum amount of training.

Other objects and advantages will appear as the specification proceeds, and the novel features of the invention will be particularly pointed out in the appended claims.

Drawings

For a better understanding of the invention, reference should be had to the accompanying drawings, forming part of this specification, in which.

While I have shown only the preferred embodiment of my invention, it should be understood that various changes, or modifications, may be made within the scope of the appended claims without departing from the spirit thereof.

Detailed description

Figure 1:
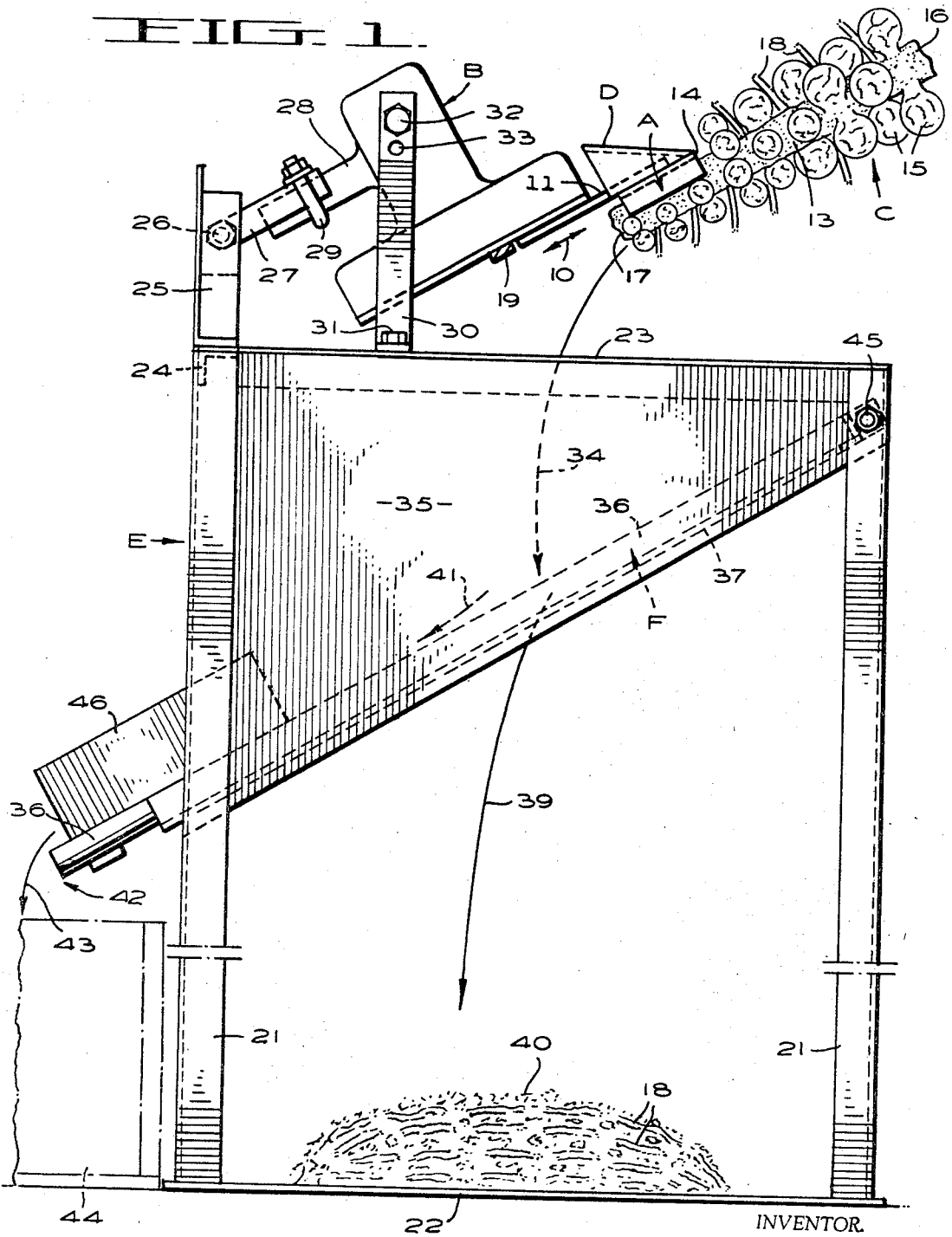
FIG. 1 is a side elevational view of my apparatus for stripping Brussels sprouts.

Referring now to the drawings in detail, the apparatus for stripping Brussels sprouts has a cutter designated generally at A which is supported by a vibrator B and operable by the latter to reciprocate the cutter with rapid and continuous short-stroke back and forth rectilineal movements, as suggested by the double-ended arrow 10 in FIG. 1. The vibrator B may take the form of a conventional sander and it has a bar 11 that is reciprocated longitudinally and has the cutter A secured to its front end portion.

Figure 3:
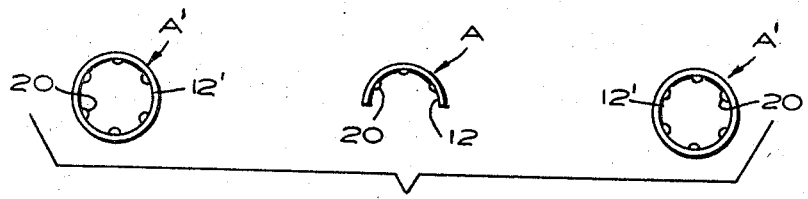
FIG. 3 is a front view of the cutters as seen from the transverse plane 3—3 of FIG. 2.

As shown in FIG. 3, the cutter A has a concaved lower face 12 constituting a guide surface disposed to have the main stalk 13 of a Brussels sprout plant C advanced therealong and guided thereby, the guide surface or concavity being dimensioned to have the main stalk inserted thereagainst, see FIG. 1.

Moreover, the cutter A is provided with an edge 14 at its forward end disposed to strip or cut sprouts 15 from the main stalk 13 as the plant is advanced manually toward the cutter. The plant C has the larger and more choice sprouts toward the relatively wide butt end 16 of the main stalk, while smaller sprouts grow near the relatively narrow tip end 17 of the main stalk. Also, stems 18 project from the main stalk and the leaves of the plant have previously been removed from these stems.

The vibrator B is actuated continuously during the stripping of the sprouts 15. The cutter A is substantially semi-cylindrical in cross-section and the concave guide surface 12 is exposed so that the main stalk 13 may be easily inserted into the cutter from below, and even crooked main stalks may be guided into the cutter for stripping the sprouts therefrom. Either end of the Brussels sprout plant C may be inserted first into the concavity of the cutter, and this is a choice on the part of the operator. It may be preferable to insert the smaller end of the main stalk first into the cutter so as to remove the smaller sprouts initially, which are rather clustered together, and this may be followed by stripping the sprouts from the larger butt end of the plant.

Figure 2:
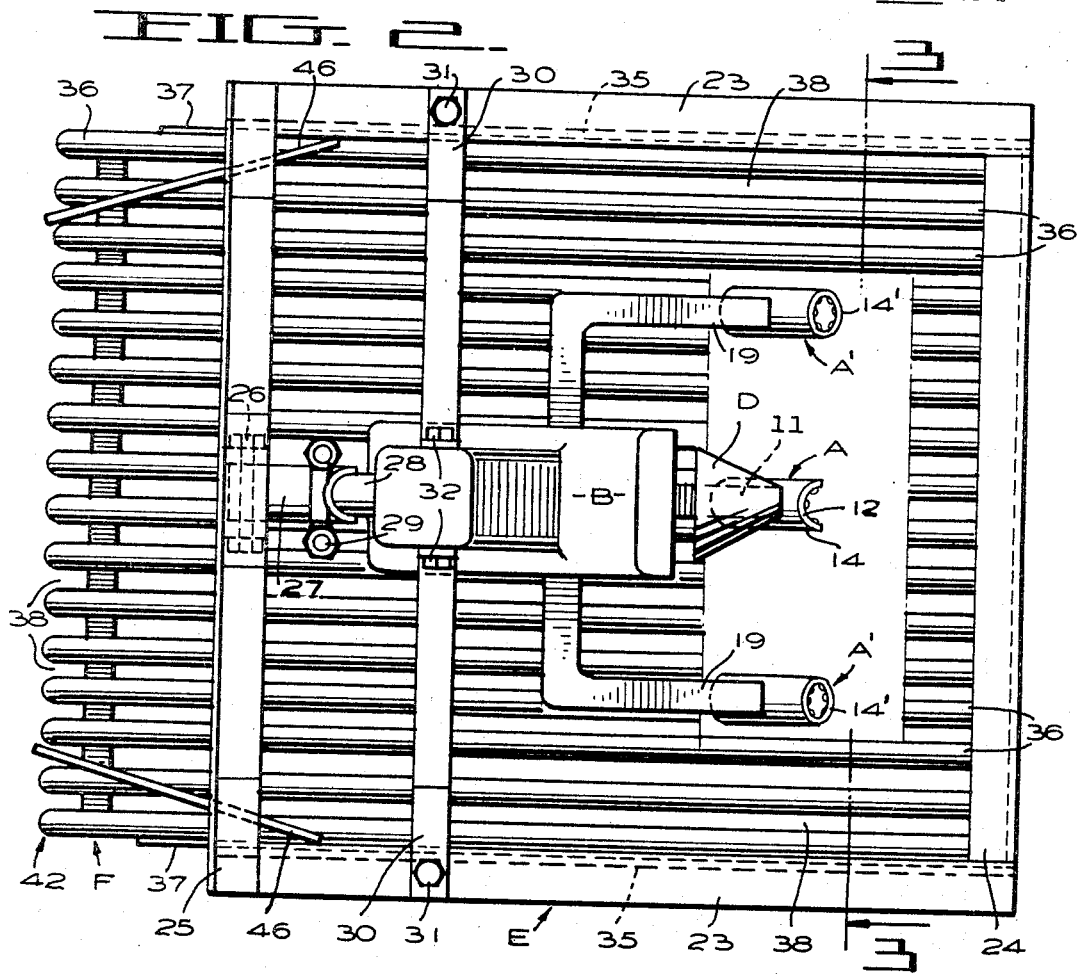
FIG. 2 is a top plan view thereof.

As shown in FIGS. 1 and 2, cutter A is entirely unobstructed from its front through a complete circle, whereby the operator may hold and freely move the plant C into engagement with the cutter during stripping of the sprouts.

It will be noted that a pair of auxiliary cutters A' have been shown in FIG. 2 and in FIG. 3 that are substantially cylindrical or tubular, the guide surface 12' of each of these cutters being provided by the bore wall thereof and into which the main stalk 13 of the plant C may be inserted so that the sprouts will be stripped from the plant by the forward edges 14' of the auxiliary cutters. The latter are useful in removing the smaller sprouts from the tip portion 17 of the plant, and in some cases the entire plant may be advanced through the bore of these cutters.

As disclosed in FIGS. 1 and 2, a bracket 19 is carried by the undersurface of the vibrator B and this bracket has the auxiliary cutters A' secured thereto so that these cutters will be reciprocated back and forth axially by the vibrator.

It is important to note that the guide surfaces of the cutter A and the auxiliary cutters A' are provided with raised abutments 20 disposed to bear against the main stalk 13 of the plant C and being positioned to preclude the cutting edges 14 and 14', respectively, from gouging into the main stalk 13 of the plant C as the latter is advanced. These abutments may take the form of a series of parallel raised ribs that extend longitudinally along the guide surfaces of the respective cutters.

In FIGS. 1 and 2, a deflecting shield D representing about one-half of a cone is mounted on the cutter A in a position to deflect the stripped sprouts 15 away from the vibrator B.

In order to mount the vibrator B and the cutters A and A' at a convenient height, a supporting frame indicated generally at E has been provided. This frame includes upright legs 21 that are fixed at their lower ends to sill plates 22 (see FIG. 1). Longitudinal and transverse frame members 23 and 24, respectively, are fixed to the tops of the legs 21. Also, an arched bar 25 is mounted on the supporting frame E and has a pivot bolt 26 at its midportion on which a bracket 27 is mounted for vertical swinging adjustment, that is, around the axis of the bolt 26. The vibrator B has a handle 28 that may be secured to the bracket 27 by any suitable means, for instance, a clamp 29. Thus the vibrator B and the cutters A and A' may be raised or lowered with swinging movement about the bolt 26 so that the inclination of the cutters may be varied to suit the operator. An intermediate bracket 30 is secured to each of the longitudinal frame members 23 by bolts 31, while the inner ends of these two brackets are conected by bolts 32 to the vibrator B. A series of holes 33 may be fashioned in the inner ends of the brackets 30 so that the vibrator B may be raised and lowered when changing the angle of inclination of the cutters A and A'.

As the sprouts 15, stems 18 and other debris are cut from the main stalk 13 of the Brussels sprout plant C, all will gravitate downwardly, as suggested by the arrow 34 in FIG. 1, falling between parallel spaced side plates 35 carried by the supporting frame E (see FIGS. 1 and 2).

It will be observed that a grill F is mounted below the cutters A and A' in a position to receive stripped sprouts 15, cut stems 18 as well as other debris from the Brussels sprouts plant C. This grill has been provided by a series of tubes or bars 36 that are arranged in spaced parallel relation with one another and fixed to a swingable frame 37. Undersized sprouts and stems will pass through spaces 38 between adjacent tubes 36, as suggested by the arrow 39 in FIG. 1 and wall into a heap 40 for being discarded as waste material. However, those sprouts of at least a predetermined minimum size will roll downwardly along the grill which is inclined relative to the horizontal, the movement of these sprouts being indicated by the arrow 41, falling over the lower end 42 of the grill as suggested by the arrow 43 and entering a bin or box 44 and it is these sprouts that will be retained for merchandising.

The grill frame F is swingably mounted by a bolt 45 to the supporting frame E, whereby the inclination of the grill may be adjusted, and also to permit bins or boxes 44 of various heights to be placed under the lower end of the grill. Inclined baffle plates 46 are provided on the grill so as to direct the gravitating sprouts into the bin or box 44. Thus the culls, stems and other debris are all effectively separated from the good sprouts that are to be used.

Vibrator B and its cutter A may be detached from the supporting frame E and used to strip Brussels sprouts while the plants are still in the ground, with a basket arranged to collect the stripped sprouts.

I claim:

1. In an apparatus for stripping Brussels sprouts:
(a) a cutter having a guide surface disposed to have the main stalk of an unimpaled Brussels sprout plant advanced therealong and giuded thereby, the cutter being provided with an edge disposed to strip sprouts from the plant as the latter is advanced, the cutter being entirely unobstructed from its front through a complete circle, whereby an operator may hold and freely move the plant into engagement with the cutter during stripping of the sprouts;
(b) a vibrator connected to the cutter and being operable to reciprocate the cutter with rapid and continuous short-stroke back and forth rectilineal movements during stripping of the sprouts;
(c) and a grill mounted below the cutter in a position to receive stripped sprouts gravitating from the cutter;
(d) the grill defining spaces through which undersized sprouts and stems of the plant may pass so as to be separated from sprouts of at least a predetermined minimum size, the grill being inclined so that the larger sprouts may gravitate over the lower end of the grill into a bin or box;
(e) the upper end of the grill being swingably mounted on a supporting frame, whereby the lower end of the grill may be raised or lowered to accommodate bins or boxes of various heights.

2. In an apparatus for stripping Brussels sprouts:
(a) a cutter having a guide surface disposed to have the main stalk of a Brussels sprout plant advanced therealong and guided thereby, the cutter being provided with an edge disposed to strip sprouts from the plant as the latter is advanced;
(b) a vibrator connected to the cutter and being operable to reciprocate the latter back and forth in rectilineal movements during stripping of the sprouts;
(c) and the guide surface of the cutter being provided with raised abutments disposed to bear against the main stalk of the plant and being positioned to preclude the cutting edge of the cutter from gouging into the main stalk as the plant is advanced.

3. In an apparatus for stripping Brussels sprouts:
(a) a cutter having a guide surface disposed to have the main stalk of a Brussels sprout plant advanced therealong and guided thereby, the cutter being provided with an edge disposed to strip sprouts from the plant as the latter is advanced;
(b) a vibrator connected to the cutter and being operable to reciprocate the latter back and forth in rectilineal movements during the stripping of the sprouts;
(c) and a rearwardly-diverging deflecting shield mounted on the cutter and being disposed between the cutter edge and the vibrator in a position to deflect the stripped sprouts away from the vibrator.

4. In an apparatus for stripping Brussels sprouts:
(a) a cutter having a guide surface disposed to have the main stalk of a Brussels sprout plant advanced therealong and guided thereby, the cutter being provided with an edge disposed to strip sprouts from the plant as the latter is advanced;
(b) a vibrator connected to the cutter and being operable to reciprocate the latter back and forth in rectilineal movements during the stripping of the sprouts;
(c) the vibrator constituting a support for the cutter and being actuated continuously during the stripping of the sprouts;
(d) the guide surface of the cutter being concaved and dimensioned to have the main stalk of the plant inserted thereinto;
(e) and the guide surface of the cutter being provided with a series of parallel raised ribs disposed to bear against the main stalk of the plant, and these ribs being positioned to preclude the cutting edge of the cutter from gouging into the main stalk as the plant is advanced.

References Cited

UNITED STATES PATENTS

| 247,718 | 9/1881 | Warfield | 130—9.3 |
| 279,833 | 6/1883 | Smith | 130—9.3 |
| 431,176 | 7/1890 | Thissell | 209—99 |

ABRAHAM G. STONE, *Primary Examiner.*

R. C. HARRINGTON, *Assistant Examiner.*

U.S. Cl. X.R.

130—5; 146—129